United States Patent [19]

Czuszak

[11] 4,333,343
[45] Jun. 8, 1982

[54] CENTRIFUGALLY ACTUATED TRIP MECHANISM

[75] Inventor: Charles C. Czuszak, Greensburg, Pa.

[73] Assignee: Elliott Turbomachinery Co., Inc., Jeannette, Pa.

[21] Appl. No.: 200,859

[22] Filed: Oct. 27, 1980

[51] Int. Cl.³ .................... G01P 3/16; G05D 13/04
[52] U.S. Cl. ............................. 73/538; 74/3
[58] Field of Search ............ 73/538; 200/80 R; 74/3; 137/57

[56] References Cited
U.S. PATENT DOCUMENTS

| | | | |
|---|---|---|---|
| 2,973,771 | 2/1959 | Barth et al. | 137/57 |
| 3,348,420 | 9/1965 | Schlirf | 73/538 |
| 3,374,680 | 3/1968 | Geary | 73/538 |

Primary Examiner—James J. Gill
Attorney, Agent, or Firm—J. Raymond Curtin; John S. Sensny

[57] ABSTRACT

A trip mechanism for use with a rotatable shaft comprising a Belleville spring encircling the shaft, a pair of collars secured to the shaft for mounting the spring thereon and engaging the spring to transmit rotary motion from the shaft to the Belleville spring, and a plurality of weights connected to the spring. The spring includes a reinforcing band portion annularly extending therearound, and the Belleville spring and weights are so proportioned that the spring will snap overcenter when the rotational speed of the shaft exceeds a preset value and will snap back overcenter toward an unstressed position when the rotational speed of the shaft is reduced.

5 Claims, 3 Drawing Figures

CENTRIFUGALLY ACTUATED TRIP MECHANISM

BACKGROUND OF THE INVENTION

This invention generally relates to trip mechanisms for rotary machines, and more specifically to a Belleville spring type of trip mechanism. Even more specifically, the present invention relates to a Belleville spring type of trip mechanism particularly well adapted for use with rotatable shafts which rotate at speeds less than approximately 7000 rotations per minute.

Trip mechanisms are frequently employed with rotary machines to reduce the speed thereof or to completely terminate operation of the rotary machine upon the occurrence of an undesirable operating condition such as excessive shaft speed. One type of trip mechanism which is commonly used is the Belleville spring type, which generally includes a Belleville spring, a pair of mounting collars, and a plurality of weights. A thorough explanation of this type of trip mechanism may be found in U.S. Pat. Nos. 2,973,771 and 3,374,680.

Briefly describing the Belleville spring type of trip mechanism, the Belleville spring is shaped like a dished washer and encircles a rotatable shaft, and the collars of the trip mechanism are connected to the shaft at opposite sides of the Belleville spring to mount the spring on the shaft. Rotary motion is transmitted from the shaft to the spring, for example via frictional contact between the spring and the collars. The weights are secured to the Belleville spring and, in a manner well known to those skilled in the art, the weights and the spring are so designed that the spring will snap overcenter, that is turn inside out, when the shaft speed exceeds a predetermined value. This snapping action is employed to actuate a valve or other control element to stop the shaft or at least reduce the speed thereof. Once shaft speed is reduced to a second predetermined value, the Belleville spring snaps back overcenter toward its unstressed position.

In many applications, Belleville spring type trip mechanisms are relatively simple and inexpensive yet reliable and effective, and this type of trip mechanism has found wide industrial acceptance. Certain design difficulties, however, have been encountered when using Belleville spring type trip mechanisms with slow or medium speed rotary machines, for example machines having a shaft which rotates at less than approximately 7000 revolutions per minute. These difficulties are especially significant if the rotary machine is relatively small.

As alluded to above, the dimensions of the spring, specifically its thickness and diameter, are chosen so that the spring snaps overcenter at a preselected shaft speed. Generally, the larger the ratio of spring diameter to spring thickness, the lower the shaft speed at which the spring will snap overcenter. Thus, to decrease the shaft speed at which the Belleville spring will snap overcenter, the spring diameter may be increased and/or the spring thickness may be decreased. It is commonly preferred, though, that the spring thickness be no less than approximately 1.4 millimeters (0.055 inches) because if the spring thickness is less, the snapping action of the spring may become relatively slow and gradual. With a gradual turning over, the Belleville spring may actuate the control element, which stops or slows down the rotary machine, before or after the shaft speed reaches the preselected spring snapping value. Thus, the accuracy of the trip mechanism is reduced.

Obviously, this difficulty can be overcome by maintaining the spring at least 1.4 millimeters (0.055 inches) thick. Once a Belleville spring has been reduced to this thickness, to decrease further the shaft speed at which the spring will snap overcenter, the spring diameter may be increased. However, there also are limitations to the extent to which the spring diameter may be increased. Specifically, as may be appreciated, besides a shaft overspeed trip mechanism, rotary machines include a multitude of other components such as bearings, housings, and seals. These other components may strictly limit the size of a Belleville spring which may be used with a particular rotary machine. Even if the size of the spring is not strictly limited, using a Belleville spring having a diameter greater than a certain size may require special, costly modifications to the other components of the machine. These size constraints are particularly severe when designing a Belleville spring type trip mechanism for a low or medium speed, small rotary machine. The various components of the rotary machine are comparatively small and closely fitted together, and the preferred spring diameter to spring thickness ratio is relatively large.

SUMMARY OF THE INVENTION

In view of the above, an object of the present invention is to improve trip mechanisms, specifically Belleville spring type trip mechanisms.

Another object of this invention is to provide a relatively small Belleville spring type trip mechanism for use with shafts which rotate at speeds less than approximately 7000 rotations per minute.

A further object of the present invention is to decrease the thickness of a Belleville spring used in a trip mechanism without affecting the accuracy and predictability with which the spring will snap between normal and overcenter positions.

These and other objectives are attained with a trip mechanism for use with a rotatable shaft comprising a Belleville spring encircling the shaft, collar means secured to the shaft for mounting the spring thereon and engaging the spring to transmit rotary motion from the shaft to the Belleville spring, and a plurality of weights connected to the spring. The Belleville spring includes a reinforcing band portion annularly extending therearound, and the spring and weights are so proportioned that the spring will snap overcenter when the rotational speed of the shaft exceeds a present value and will snap back overcenter toward an unstressed position when the rotational speed of the shaft is reduced.

A BRIEF DESCRIPTION OF THE DRAWINGS

A DETAILED DESCRIPTION OF THE PREFERRED EMBODIMENT

Figure 1:
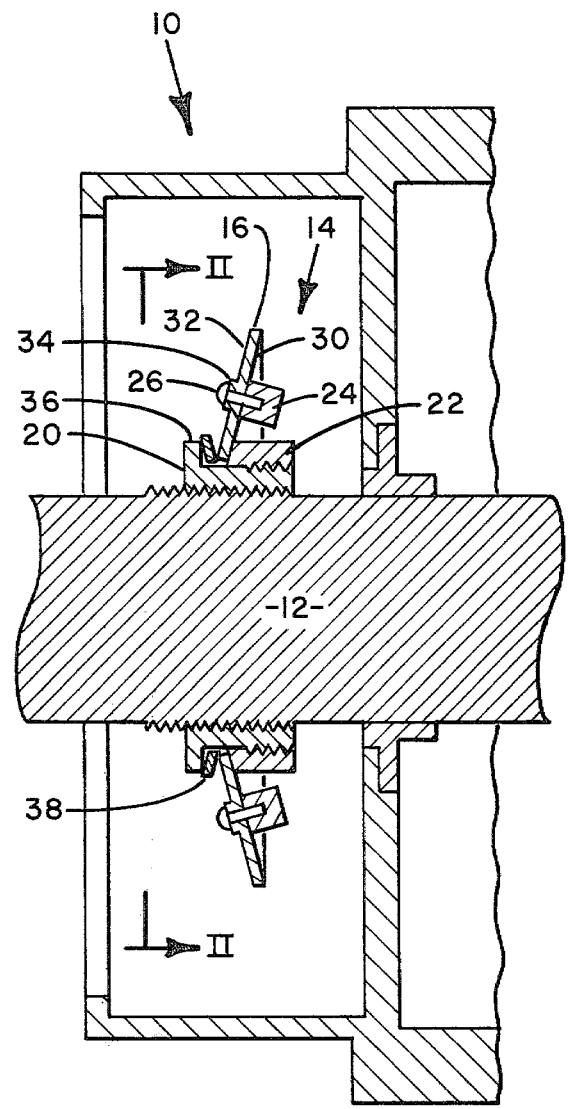
FIG. 1 is a side sectional view taken through a part of a rotary machine showing a trip mechanism constructed in accordance with a preferred embodiment of the present invention.
Figure 2:
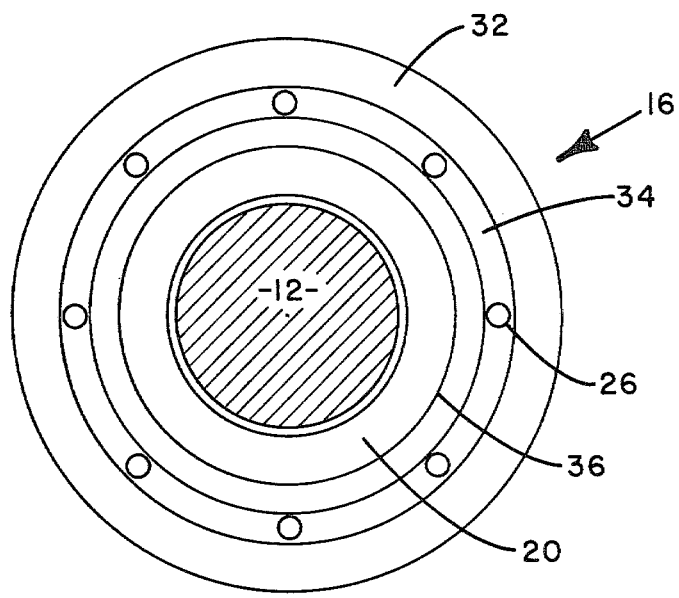
FIG. 2 is an end sectional view taken along line II—II of FIG. 1.

Referring to the drawings and particularly to FIG. 1, there is illustrated a small part of rotary machine 10 such as a gas compressor or a gas or steam driven turbine. Machine 10 includes rotatable shaft 12 and trip mechanism 14. Trip mechanism 14, in turn, includes Belleville spring 16, mounting collars 20 and 22, a plurality of weights 24, and securing means such as rivets 26.

Belleville spring 16 generally has the shape of a dished washer and includes normally concave first side 30, normally convex second side 32, and reinforcing band portion 34 which annularly extends around the Belleville spring. Preferably, band 34 is integral with the remaining portions of Belleville spring 16, is located on second side 32 thereof, and is approximately equidistant between the inner and outer circumferential edges of the Belleville spring.

Spring 16 encircles shaft 12, and collars 20 and 22 are secured to the shaft for mounting the Belleville spring thereon. More specifically, long collar 20 is screwed onto shaft 12, a first axial end of the long collar includes radial flange portion 36, and a second axial end of the long collar includes external threads. Short collar 22 is screwed over these external threads of long collar 20 and is axially spaced from radial flange 36.

Belleville spring 16 is axially positioned between flange 36 and short collar 22 and radially projects a considerable distance therebeyond. The inside circumferential edge of Belleville spring 16 is radially located within flange 36 and short collar 22 and is slightly spaced from the axially extending surface of long collar 20. In this manner, flange 36 and short collar 22 limit axial movement of Belleville spring 16, but the spring does not bind against long collar 20. Preferably, a second Belleville spring 38, considerably smaller than first spring 16, is disposed between flange 36 and first Belleville spring 16 and urges the first Belleville spring into frictional, driving engagement with short collar 22, wherein the short collar transmits rotary motion of shaft 12 to first Belleville spring 16.

Weights 24 are mounted on Belleville spring 16, particularly first side 30 thereof. Even more specifically, weights 24 are equally spaced apart and arranged in a circle around Belleville spring 16 approximately midway between the inside and outside circumferential edges thereof, where the stress level on the spring is the lowest. Rivets 26 extend through Belleville spring 16, including reinforcing band portion 34 thereof, to secure weights 24 thereto.

Figure 3:
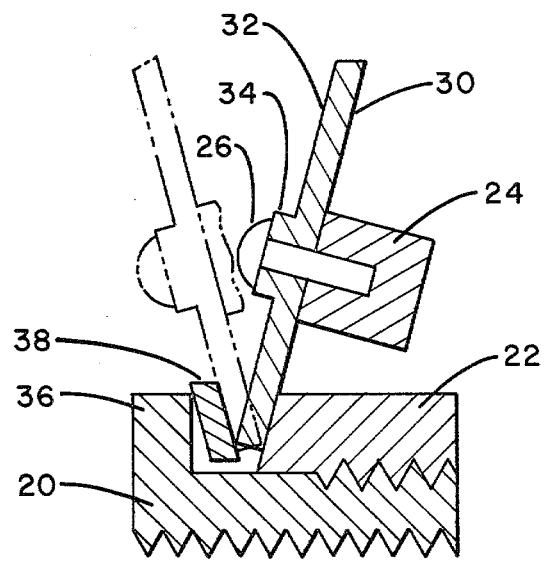
FIG. 3 is an enlarged view of a portion of FIG. 1.

With trip mechanism 14 as described above, as shaft 12 rotates, weights 24 apply centrifugal forces to Belleville spring 16, causing the spring to stretch radially and deflect toward a vertical, planar position. Spring 16 and weights 24 are so proportioned that, when the rotational speed of shaft 12 exceeds a preset value, the spring will snap overcenter and turn inside out into the position shown in broken lines in FIG. 3. In any one of many ways well known to those skilled in the art, this snapping action may be employed to actuate a control member such as a valve or a switch to terminate or slow down the rotation of shaft 12. Once shaft speed is reduced below a certain level, Belleville spring 16 snaps back overcenter toward the unstressed position shown in cross section in FIGS. 1 and 3.

As previously mentioned, with prior art Belleville spring type trip mechanisms, there is a commonly accepted minimum Belleville spring thickness below which the snapping action of the spring may not be as quick or regular as is usually desired. This minimum thickness is a design constraint, particularly vexatious in relation to low or medium speed, small rotary machines. Applicant has discovered, however, that by providing Belleville spring 16 with reinforcing band portion 34, the snapping action of the spring is quick, reliable, and accurate even though the thickness of the spring is less than the above-mentioned commonly accepted minimum. That is, spring 16 will quickly snap overcenter when the speed of shaft 12 exceeds a certain value, will reliably remain in the overcenter position as the shaft speed decreases, and then will quickly snap back to the normal position when the shaft speed falls below a second lower predetermined value. Hence, applicant has significantly lessened the design limitations of Belleville spring type trip mechanisms.

For example, compared with prior art Belleville spring type trip mechanisms, trip mechanism 14 of the present invention may use a thinner Belleville spring and may thus achieve the same spring diameter to spring thickness ratio with a smaller spring diameter. Since the shaft speed at which the Belleville spring will snap overcenter is a function of this ratio, trip mechanism 14 of the present invention may be provided with a Belleville spring having a smaller diameter than the Belleville spring of a prior art trip mechanism which snaps overcenter at the same shaft speed. Because the diameter of the Belleville spring largely determines the diameter of the trip mechanism as a whole, trip mechanism 14 of the present invention may thus be smaller than prior art Belleville spring type trip mechanisms. Consequently, trip mechanism 14 may more readily fit within rotary machine 10 without requiring special modifications thereof, eliminating the cost of making such modifications.

It should be noted that, while preferably reinforcing band portion 34 is located on the normally convex side of spring 16 about midway between the inside and outside circumferential edges thereof, the reinforcing band portion may be located elsewhere along spring 16. For example, satisfactory results have been obtained when band portion 34 is located on the convex side of spring 16 adjacent the outside circumferential edge thereof, and when band portion 34 is located on the concave side of spring 16 approximately halfway between the inside and outside circumferential edges thereof. In view of this, it is believed that acceptable results may be obtained by locating annular band 34 anywhere along spring 16. Applicant is not certain why reinforcing band 34 produces the above-discussed effect. One possible explanation, though, is that reinforcing band 34 increases the stiffness of Belleville spring 16 without significantly affecting the mass or average thickness of the spring.

Returning to the specific, preferred dimensions of Belleville spring 16, these dimensions will, of course, differ from application to application, with the size of the spring, particularly its diameter and thickness, being changed to vary the shaft speed at which the spring snaps overcenter. Several springs which have proved satisfactory have an inner diameter of 7.6 centimeters (3.0 inches), an outer diameter of 15.2 centimeters (6.0 inches), and a thickness of between 0.89 and 1.1 millimeters (0.035 and 0.045 inches). The reinforcing bands of these springs have a radial width of 7.9 millimeters (0.31 inches) and an axial thickness of between 0.25 and 0.51 millimeters (0.010 and 0.020 inches), and these bands are located midway between the inside and outside diameters of the Belleville spring on the normally convex side thereof.

Thus, applicant has provided a unique and useful Belleville spring type trip mechanism, substantially decreasing the design limitations thereof. Particularly, applicant's invention may be easily and effectively employed to reduce the size of a Belleville spring type trip mechanism while maintaining the crucial snapping action thereof. Furthermore, with the preferred embodiment illustrated in the drawings, because rivets 26 extend through reinforcing band portion 34 as well as the main body of Belleville spring 16 to secure weights 24 thereto, the reinforcing band strengthens the areas of the Belleville spring to which the weights are secured. Weights 24 are more securely held in their precise, preferred positions, increasing the accuracy, reliability, and life span of trip mechanism 14.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A trip mechanism for use with a rotatable shaft comprising:
   a Belleville spring encircling the shaft;
   collar means secured to the shaft for mounting the spring thereon and engaging the spring to transmit rotary motion from the shaft to the Belleville spring; and
   a plurality of weights connected to the spring; wherein the spring includes
      a reinforcing band portion annularly extending around the Belleville spring, the spring and weights being so proportioned that the spring will snap overcenter when the rotational speed of the shaft exceeds a preset value and will snap back overcenter toward an unstressed position when the rotational speed of the shaft is reduced.

2. A trip mechanism as defined by claim 1 wherein the reinforcing band portion is radially located approximately equidistant between inside and outside circumferential edges of the Belleville spring.

3. A trip mechanism as defined by claims 1 or 2 wherein:
   the Belleville spring includes
      a first, normally concave side, and
      a second, normally convex side;
   the weights are mounted on the first side of the Belleville spring; and
   the reinforcing band portion is located on the second side of the Belleville spring.

4. A trip mechanism as defined by claim 3 further comprising:
   securing means extending through the Belleville spring including the reinforcing band portion thereof for securing the weights to the spring, wherein
   the reinforcing band portion strengthens the areas of the Belleville spring to which the weights are secured.

5. A trip mechanism as defined by claim 4 wherein the reinforcing band portion is integral with the first and second sides of the Belleville spring.

* * * * *